US006964189B2

(12) United States Patent
Carlson et al.

(10) Patent No.: US 6,964,189 B2
(45) Date of Patent: Nov. 15, 2005

(54) PORTABLE AEROSOL CONTAMINANT EXTRACTOR

(75) Inventors: Duane C. Carlson, N. Augusta, SC (US); John J. DeGange, Aiken, SC (US); Paula Cable-Dunlap, Waynesville, NC (US)

(73) Assignee: Westinghouse Savannah River Company, LLC

( * ) Notice: Subject to any disclaimer, the term of this patent is extended or adjusted under 35 U.S.C. 154(b) by 0 days.

(21) Appl. No.: 10/786,625

(22) Filed: Feb. 25, 2004

(65) Prior Publication Data

US 2005/0193803 A1 Sep. 8, 2005

(51) Int. Cl.[7] .......................... G01N 37/00; B03C 3/45
(52) U.S. Cl. ............... 73/28.02; 73/863.22; 73/863.25; 96/98
(58) Field of Search ........................... 73/28.02, 31.07, 73/865.5, 863.21, 863.22, 863.24, 863.25; 209/12.2, 127.1, 128, 129; 96/26, 39, 42, 96/57, 98

(56) References Cited

U.S. PATENT DOCUMENTS

| | | | | |
|---|---|---|---|---|
| 2,868,318 | A | 1/1959 | Perkins et al. | |
| 3,520,172 | A | 7/1970 | Liu et al. | |
| 3,718,029 | A * | 2/1973 | Gourdine et al. | 73/28.02 |
| 3,827,217 | A | 8/1974 | Volsy | |
| 3,853,750 | A | 12/1974 | Volsy | |
| 3,879,986 | A | 4/1975 | Sehmel | |
| 3,957,374 | A | 5/1976 | Kriese | |
| 3,978,397 | A | 8/1976 | Burry | |
| 4,357,150 | A * | 11/1982 | Masuda et al. | 95/63 |
| 4,788,430 | A | 11/1988 | Gonthier | |
| 5,150,036 | A * | 9/1992 | Pourprix | 324/71.4 |
| 5,302,190 | A * | 4/1994 | Williams | 95/57 |
| 5,466,279 | A * | 11/1995 | Hattori et al. | 96/69 |
| 6,176,977 | B1 * | 1/2001 | Taylor et al. | 204/176 |

FOREIGN PATENT DOCUMENTS

| | | | | |
|---|---|---|---|---|
| JP | 59081564 A | * | 5/1984 | 73/28.02 |

* cited by examiner

*Primary Examiner*—Michael Cygan
(74) *Attorney, Agent, or Firm*—McNair Law Firm, P.A.

(57) ABSTRACT

A compact, portable, aerosol contaminant extractor having ionization and collection sections through which ambient air may be drawn at a nominal rate so that aerosol particles ionized in the ionization section may be collected on charged plate in the collection section, the charged plate being readily removed for analyses of the particles collected thereon.

17 Claims, 4 Drawing Sheets

PORTABLE AEROSOL CONTAMINANT EXTRACTOR

The United States Government has rights in this invention pursuant to Contract No. DE-AC09-96SR18500 between the U.S. Department of Energy and Westinghouse Savannah River Company.

FIELD OF THE INVENTION

This invention relates to an apparatus and method for collecting aerosol or airborne particles for analysis from a defined sample of air. More particularly, the invention relates to a portable, compact aerosol contaminant extractor for collecting ionized particulate matter on a charged substrate at selected locations and times and for predetermined periods of time.

BACKGROUND OF THE INVENTION

While it has always been important, air pollution has become an even greater concern today. Not only is there concern over the air pollutants emitted by industrial processes and electric power generating stations, there is also increasing concern over the deliberate pollution of the atmosphere by terrorist groups with toxic or radioactive pollutants. Thus, more than ever it is necessary to have quick and easy methods of collecting and identifying air pollutants and to determine the location from which such particles are emitted.

Accordingly, it is a general object of the present invention to provide a method and apparatus for rapidly and easily extracting pollutants from the air for analysis and identification.

Today, there are many state, federal, and municipal regulations relating to the permissible level of particulate matter that can be emitted in industrial processes and reliable, inexpensive means are needed to determine if the regulatory requirements are being met.

Accordingly, it is another object of the present invention to provide a means and method for the determination of the level of undesirable particulate matter at various locations and altitudes, and at various times.

In the prior art, probably the most commonly employed method for measuring particulate matter in the air has been to force air samples to flow through a filter or a series of filters after which the filters are weighed and analyzed for the presence of particulate matter. However, significant pumping power is required to force air through filters and while this can be done on a stationary basis, the amount of power required for sampling for extended periods of time makes it impractical to use filters in a portable detector. Accordingly, it is another object of this invention to provide a particulate matter extractor which can be operated for relatively long periods of time with very low energy consumption. Furthermore, not only is it difficult and expensive to separate particles from a filter, filters are size sensitive as very small particles will pass through with only larger ones being entrapped in the filter.

As an alternative to filters, use has been made of electrostatic precipitators to collect particles. One of these prior art devices is described in U.S. Pat. No. 2,868,318, which issued on Jan. 13, 1959 to W. A. Perkins, et al. In the Perkins' device a coronal glow discharge in air around a cathode is established and particles charged thereby are collected on an anode spaced at some distance from the cathode. However, it appears that this precipitator device must be disassembled and the anode removed to analyze samples. Accordingly, it is another object of the present invention to provide a method and apparatus whereby the extractor does not require extensive dismantling in order to recover the collected particulate matter for analysis.

In another prior art device, electrostatic precipitation is employed to determine the mass of particulate matter entrained in a gaseous flow per unit volume. This device is described in U.S. Pat. No. 3,718,029 which issued on Feb. 27, 1973 to Gourdine et al. In this patent, the dust particles in the air are charged by an electric field and are subsequently collected on a dielectric surface positioned in front of the grounded electrode. The amount of accumulated charge on the dielectric surface is subsequently measured by an induction electrode to determine the particulate mass per unit volume of the air flow. In this patent, a quantitative method of determining particulate matter is disclosed but no means is provided to remove the particles for qualitative analysis. Accordingly, it is another object of the present invention to provide a method and means for qualitative determination of the make up of the particulate matter collected from air.

Yet another electrostatic precipitator is described in U.S. Pat. No. 3,879,986 which issued on Apr. 29, 1975 to George A. Schmel. In this device electrostatic precipitation onto a grid is accomplished with the use of a coronal glow discharge to charge the particles. The electrode in this case is shaped and spaced so as to allow the precipitation of particles in a controlled manner. A point electrode and a grid are used in a combination which separates particles by size. However, another object of the present invention is to provide precipitation for all charged particulate matter and not to selectively collect or precipitate particles.

Still another object of the invention is to provide a method and means for collecting aerosols for pre-determined intervals of time at selected locations.

The foregoing and other objects are achieved by the present invention which is described in the Summary of the Invention and Detailed Description and drawings which follow.

SUMMARY OF THE INVENTION

In one aspect, the present invention is a portable, compact, aerosol contaminant extractor comprising a housing with inlet and outlet ports for emitting air to be sampled and discharged after sampling; an ionizer for charging aerosols in the air which pass through the ionizer from the inlet port; a removable collector substrate plate and ground plates wherein the collector plate is positioned between and spaced apart from the ground plates, said plates being parallel to each other and being positioned so that air which has been passed through the ionizer will pass between said plates, said collector plate being maintained at a potential sufficiently higher than the ground to collect the charged aerosols; power supply means for maintaining high voltage for said ionizer and for said collector plates; means for moving the air through said inlet, ionizer, ground and collector plates and discharging same through said outlet port; and an access port in said housing positioned so that when open, said collector substrate plate may be removed whereby the aerosols collected on the plate may be analyzed. Storage means may be provided to store additional collector substrate plates. The storage means may include a method to automatically exchange exposed and unexposed discrete substrate collection surfaces. The substrate surfaces may be the surfaces of removable plates that can be stacked in a magazine or discrete areas on the surface of a belt or roll.

In another aspect, the present invention, a portable, compact, aerosol contaminant extractor, is provided having a longitudinal tubular ionizer section with inlet and outlet ends to permit the flow of air through the ionizer, the wall of said tubular section comprising an electrically conductive material, said conductive wall serving as an anode; a cathode wire longitudinally positioned in the center of said ionizer section, the dimensions of said wire and said tube being selected so that when the potential difference between said tube wall and said cathode is about at least 8,000 volts or at a level required to establish a coronal glow discharge; a generally rectangular, electrically conductive, removable collector substrate which may be a plate or a metal foil for collecting aerosol contaminants on its surface; a collection chamber having an inlet adapted to receive air discharged from the outlet of said ionization section, said chamber having two opposed ground plates having insulated plate support means associated therewith for holding and removably securing said collector substrate plate therebetween, said substrate and ground plates being mounted parallel to the direction of the flow of air through said chamber, said substrate being maintained at a potential of at least about 8,000 volts above the ground plates to collect airborne particulates that have been ionized by said coronal glow discharge; means for moving air to be sampled through said ionization section and collecting chamber; high voltage power supply means for providing said potential levels to said cathode and substrate plates; and a rigid, airtight container with closable inlet and outlet ports, said container housing the foregoing named elements, said container having a removable lid to provide access to said collector substrate.

In yet another aspect, the present invention is a portable, compact aerosol contaminant extractor comprising: a generally rectangular parallelepiped container having top, bottom, side, and end panels, the top panel being removable to permit access to the interior of the container, said container being air tight and manually portable by one person; the following elements being associated with or disposed within said container; an inlet port formed in one end panel and an outlet port formed in the other end panel of the container whereby air to be sampled can flow into and out of said container; an ionizer section in communication with said inlet port, said ionizer section comprising an ionizer ground tube having inlet and outlet ends, and an ionizer wire positioned in the longitudinal axis of said tube; an ionizer high voltage power supply for supplying voltage to said ionizer wire at a potential sufficient to cause a corona discharge in air passing through said tube; a collector chamber for receiving air discharged from said ionizer tube, said chamber comprising ground plates with a removable collection substrate plate or foil positioned therebetween, said plates being positioned so that their planar surfaces are parallel to the direction of air flow; a high voltage power supply for establishing and maintaining a potential difference between said substrate plate and said ground plates; a fan for drawing air through the inlet port into the ionizer and through the collector chamber and discharging the air through said outlet port; and an access port in the top panel of said container, said port being located above the removable collector plate so that when said port is opened the collector plate can be withdrawn therethrough.

In a further aspect, the present invention is a method of extracting aerosol contaminants at diverse locations comprising the steps of: providing an open ended, tubular ionizer for charging aerosol contaminants that pass therethrough; passing air to be sampled through said ionizer; after leaving the ionizer, passing the air sample over a charged plate positioned between the ground plates to collect charged particles on the charged plate; and, removing the charged plate from between the grounded plates; and analyzing the particles collected on said plate.

It is important to note that an advantage of using coronal glow discharge to ionize particles is that it will do so to all types of particles without atomizing (breaking down) particles. Even microbiological organisms, e.g., spores and bacterial will ionize and will stay intact so that they are viable for analysis by such means as Polymerase Chain Reaction (PCR) or amino assay. Additionally, an extremely high concentration of particulate matter will not clog the extractor of the invention. Furthermore, the device's particle collection capabilities are particle size independent. As opposed to filters that have to have certain size pores to collect certain size particles. In filtration based devices, the smaller the particle size, the more powerful the pump must be to provide the air flow needed to pull the air through the filter.

In a still further aspect, the aerosol extractor of the present invention includes an indexing system and a means for storing an unexposed substrate surface or surfaces, means for delivering and positioning an unexposed surface in a collection chamber, and means for removing an exposed substrate from the chamber and storing it. Thus, substrate surfaces can be indexed through the extractor. The substrate having a collection surface thus may be a plate or disc, a chargeable metal foil mounted on a flexible type of film or on a grid substrate, or a metallized section of a plastic film or tape.

In a yet further aspect, the aerosol extractor of the present invention includes an ionizer having a geometric configuration other than a tube or cylinder where an electrode is positioned longitudinally therein. For example, the electrode could be suspended at a right angle to the air flow rather than parallel to it in a channel of square cross-section. The electrode can be, in such a configuration, a single cross or a screen mesh.

For a better and more complete understanding of the invention, reference is made to the description of the drawings and detailed description below.

DESCRIPTION OF THE DRAWINGS

Appended hereto are drawings which are illustrative of a preferred embodiment of the present invention and are presented herewith by way of illustration and not limitation. In the drawings.

DETAILED DESCRIPTION

Figure 1:
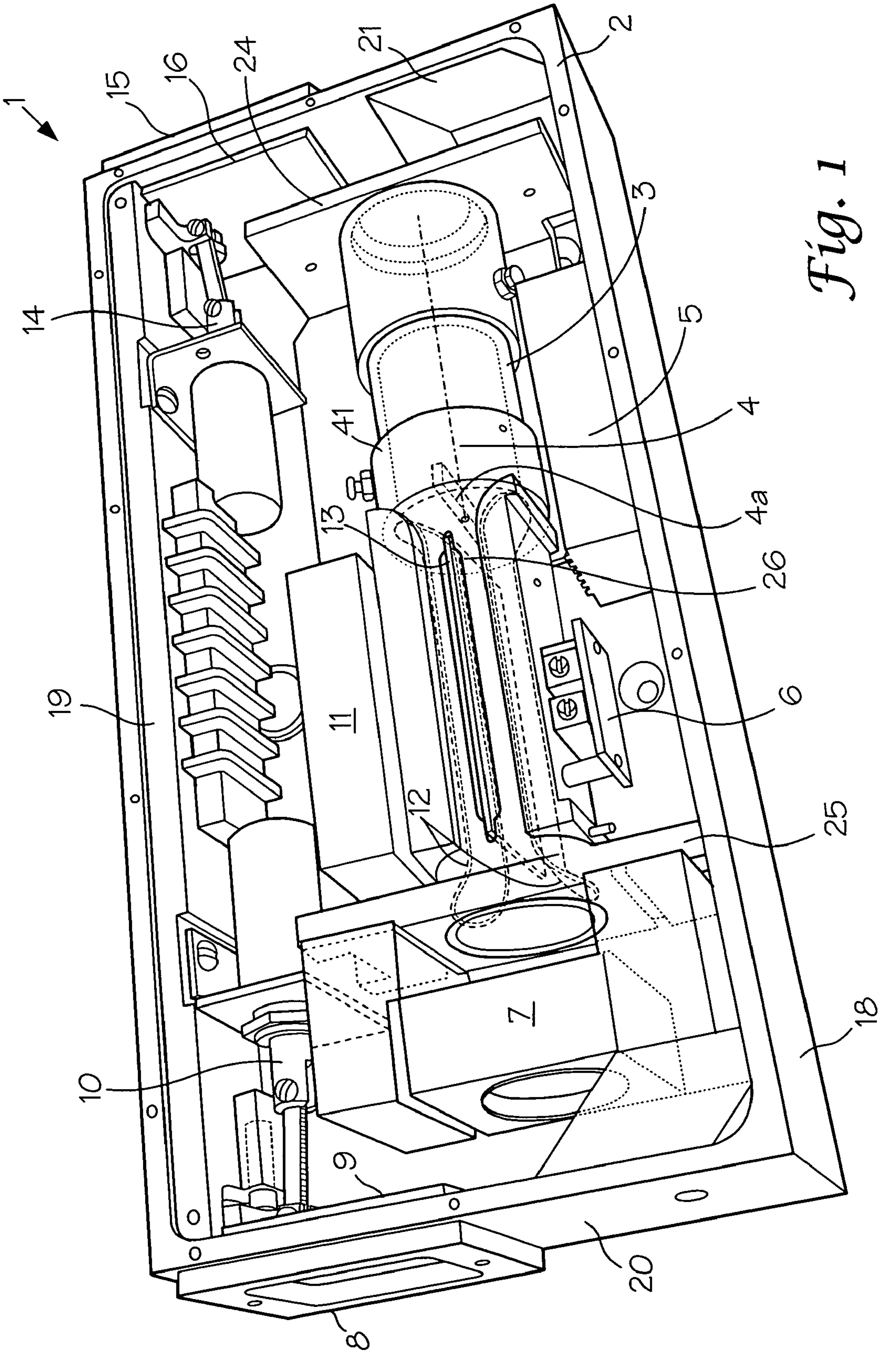
FIG. 1 is a schematic representation of the portable aerosol contaminant extractor of the present invention showing the compact arrangement of its parts within a container or housing.

Referring now to the drawings, a preferred embodiment of the invention will now be described in more detail.

The invention is a compact, portable electrostatic contaminant precipitator or extractor which has the advantages of long battery life as it does not have to pump air through a filter for collecting contaminants and it is relatively lightweight. Because of its lightweight, sturdy construction, and portability the extractor can collect air samples at selected locations to determine the effects of elevation, prevailing wind patterns, and terrain on the distribution and concentration of particles that are emitted from a known source; or, by mapping the distribution of particles over an area the source of emission of particles may be located and identified.

The collector substrate mounted within the extractor can be readily removed manually or automatically for analysis without disassembling the extractor, and the extractor can be ready to continue in operation or begin collecting again after an elapsed period of time.

Figure 2:
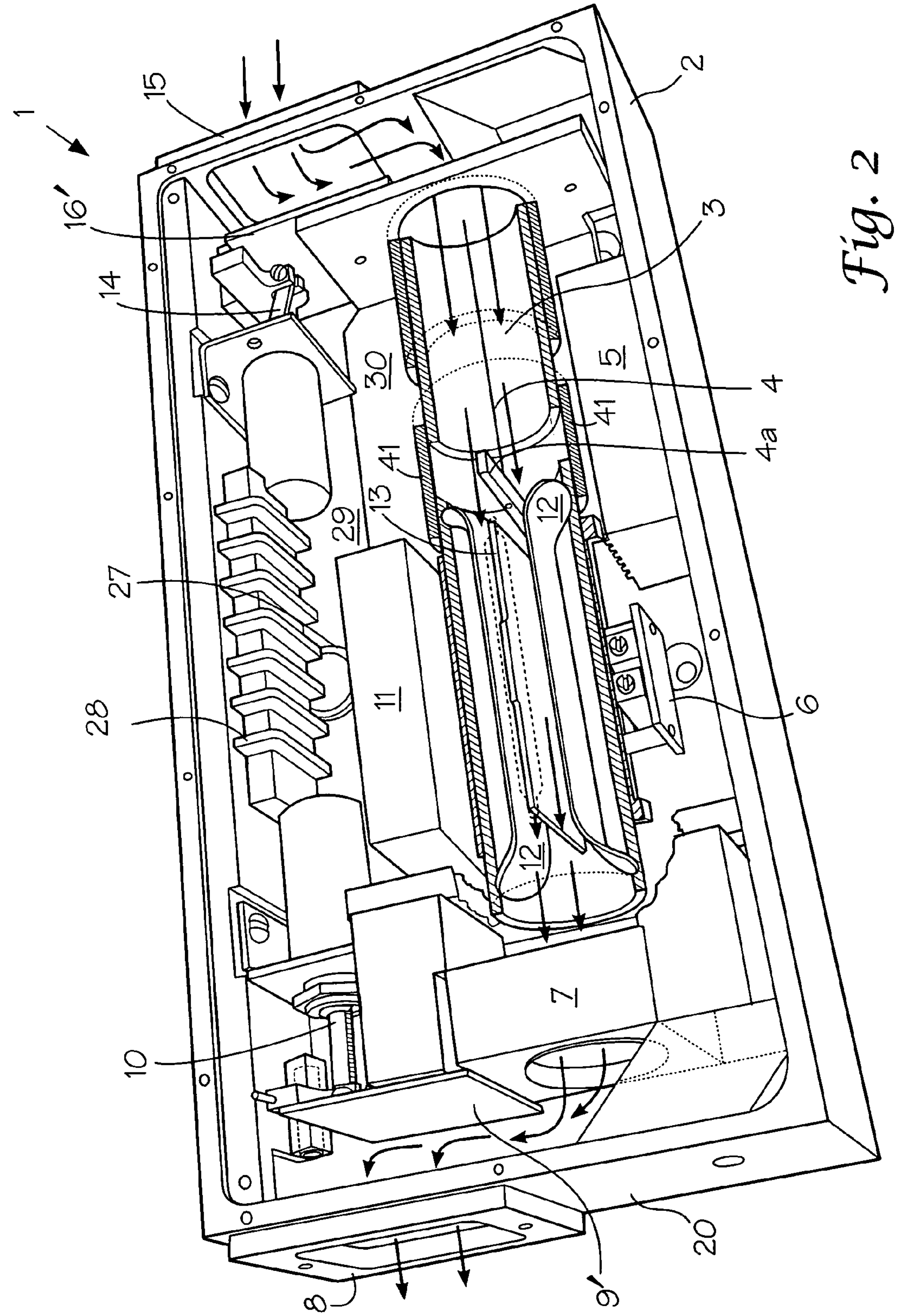
FIG. 2 is the same schematic view as FIG. 1 but with a cutaway of the ionizer and the collector plate assembly to show the flow of air through them.
Figure 3:
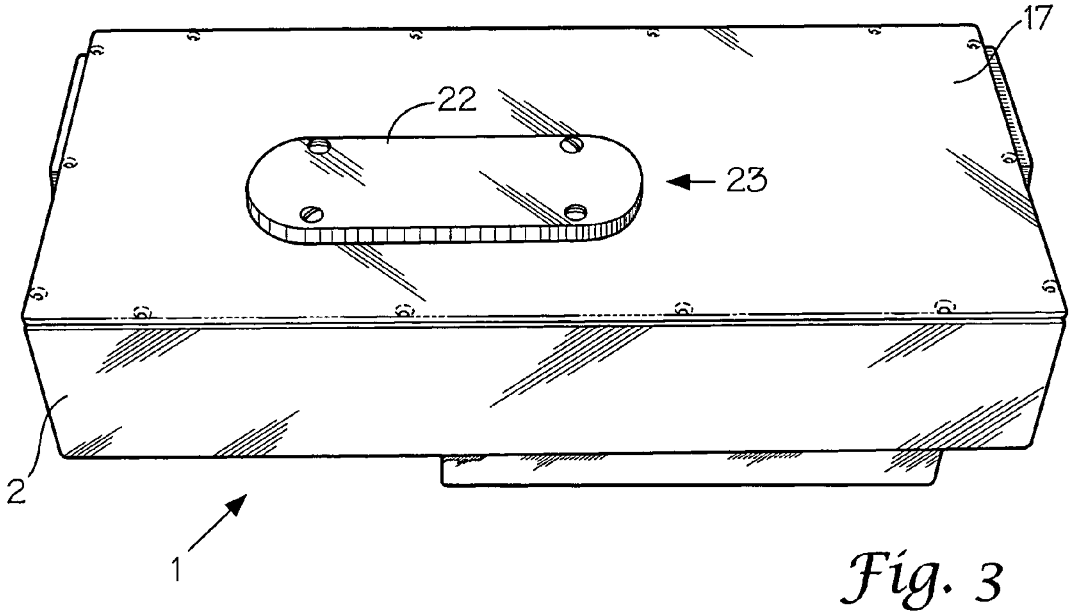
FIG. 3 is a perspective view of the present invention in its enclosed ready-to-use form.

Turning now to FIG. 1, a schematic representation in perspective is shown of the contaminant extractor 1. Its frame 2 which forms the vertical walls of the receptacle, which encloses the working components, has opposed end panels 20 and 21, opposed side panels 18 and 19, bottom panel 29, and top panel 17 which are not shown in this view but are shown in FIGS. 2 and 3, respectively. Inside the receptacle or container or frame 2, ionizer 3 is held in position by support member 30 (see FIG. 2). Ionizer wire 4 is disposed in the center of the ground tube running longitudinally and coinciding with the longitudinal axis and is held in place by ionizer wire holder 4*a*. Ionizer high voltage power supply 5 supplies the high voltage to the wire 4. Voltage at about at least 8,000 volts negative-to-ground is required to establish a coronal glow discharge using wire diameter and wire-to-wall distance in the examples. The wire may be 4 to 10 mills in diameter and may be constructed of nichrome, copper, or stainless steel or other suitable electrically conductive material. The coronal glow discharge depends on the three parameters of wire diameter, wire-to-wall distance, and voltage.

The ionizer ground tube serves as the anode and may range in diameter from 1½ to 2 inches. The length of the tube is in the range of 2 inches to 2½ inches and the thickness of the wall is about 1/16 of an inch. The tube is constructed of an electrically conductive material, such as, 316 stainless steel and, as in illustrated in FIG. 2, the air enters the extractor and then the tube 3 from the right-hand side through inlet 15 which will be described in greater detail below. As air passes through the ground tube 3 from the inlet end it then moves to the collector chamber assembly which is defined by ground plates 12 with collector plate holder 26 sandwiched therebetween holding the removable and replaceable collector substrate plate 13. The collector substrate plate may have any suitable dimensions so that it can be accommodated by the extracts and in this embodiment preferably is about 1⅝ inches by 3⅝ inches and the distance between plates is preferably about ¾ inch. The collector plate is maintained at a potential above ground of about 8,000 volts. The entire collector plate assembly comprises the voltage adjustment 25 for adjusting the voltage on the collector plate as may be necessary and this regulates the collector high voltage power supply 11.

At the outlet end of the collector chamber assembly fan 7 is positioned. The fan draws air from inlet 15 through the ionizer ground tube 3, through the collector plate assembly between the collector plate 13 and ground plates 12 and into and through the fan and out through the outlet 8. Within the container or frame 2 is also placed the outlet shutter assembly 9 which closes and opens the outlet 8 and the similar structure for the inlet shutter assembly 16 which opens the shutter for the inlet 15. Outlet shutter actuator 10 and inlet shutter actuator 14 are both solenoid operated and act to retract the respective shutters so that air may flow freely under the influence of the fan through the extractor.

Turning now to FIG. 2, the flow of air can be more readily understood as the actuators 10 and 14 which are solenoids have been retracted leaving the shutter 9 in an open position 9' as is also the case of the inlet shutter where inlet shutter assembly 16 has been drawn backwardly by the actuator to the 16' open position. The arrows indicate the flow of air as it comes in through inlet 15 and with the shutter 16 retracted to its new position 16', a channel is formed so the air flows freely to the inlet end of ground tube 3. In FIG. 2 ground tube 3 is shown with a section of the tube cut away so that the position of the ionizer wire 4 may be clearly seen and the air flow through the tube can be appreciated. The circular cylindrical wall of a tube performs two important functions. The smooth surface with no corners, ribs, grooves, or crevices does not present a collection point or surface for particles that pass through in the air stream. In other words, there are no obstructions to interrupt smooth flow of the air and no collection points are there as obstructions so the tube wall does not actively collect dust or other particles. Also, with the center ionizer wire running the length of the tube, a high charge concentration of relatively substantial length can be achieved along the small diameter ionizer wire which serves as the cathode in the ionizer assembly. To establish a coronal glow discharge, a large negative direct current potential is applied to the ionizer wire resulting in a significantly large potential drop between the ionizer wire and the tube so that a locally strong electric field is created in the immediate vicinity of the wire. The coronal glow discharge is thereby ignited and a "collision-rich" energetic environment is established in the regions surrounding the wire. The large potential drop facilitates ionization of sufficiently low ionization potential gaseous species in the corona region (in the case of flowing air, gases would include $O_2$, $CO_2$, and $N_2$). These negatively charged species move about the region between the wire and the ground tube promoting further ionization of neutral particles entering in the flowing air stream. The particles typically become negatively charged and are transported to the charged collection plate 13. The movement of the positive charged particles is achieved by both the flowing air stream and the attraction of the positively charged plate 13. This is illustrated by the arrows which represent the flow of air between the ground plate and the charged collection plate. This strong positive potential attracts and collects the negatively charged particles on the plate 13.

Figure 2A:
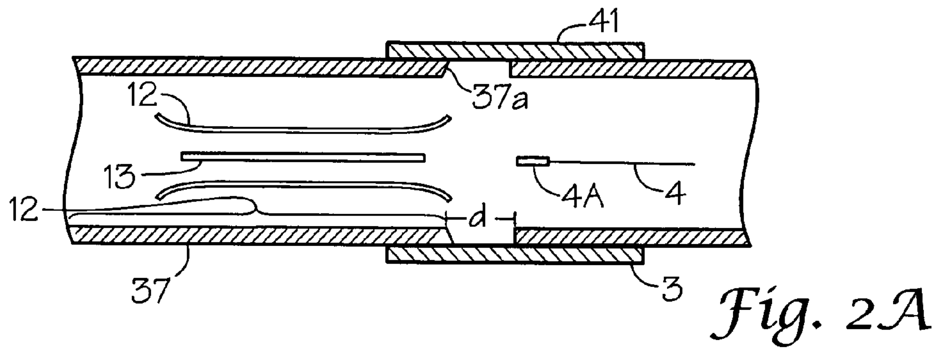
FIG. 2A is a sectional view of the ionizer and collection chamber of the present invention showing the wall cross-section and distance between the ionizer and chamber.

In FIG. 2A a cross-section of the collection chamber 37 is presented which shows the wall of the ionizer tube in sections and the wall terminates at the inlet end of the ionizer in the inward sloped surface 37*a*. The sloped surface is somewhat like an inverted beveled edge and reduces premature collection of particles. The spacing "d" between the ionizer section 3 and collection chamber 37 should, for the embodiment described herein, be a minimum of about one-half (½) inch and may be in the range from one-half (½) inch to about three fourths (¾) inch. Collar 41, which is made of a non-conductive material, preferably a thermoplastic, encloses the space between the ionizer and collection chambers.

Referring again to FIG. 2, the air that flows through the collection assembly will exit out the end towards the fan 7 and pass through the fan. As the arrows indicate, the air next moves through the inlet as the shutter actuator 10 has retracted the outlet shutter 9 to its open position 9' so that air will pass through the outlet toward 8.

Turning now to FIG. 3, the extractor 1 is shown in perspective in its closed, operating configuration with the top panel or lid 17 secured to the frame 2 which consists of the vertical side and end panels. Located on the top panel 17 is the access port 23 which is closed by access port cover 22. In this preferred embodiment, the dimensions of the extractor are 14 inches in length by 6 inches in width by 3 inches in height. The extractor weighs approximately 14 pounds. Thus, a very sturdy light weight and portable extractor is provided which can be used at almost any site to take air samples at predetermined points around a source of air pollution so as to determine the pattern and concentration of pollutant distribution.

Figure 4:
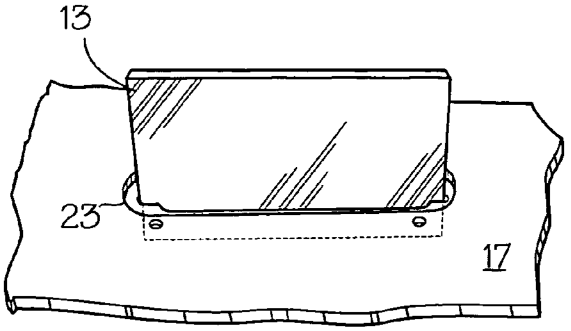
FIG. 4 shows a collector plate being withdrawn through an access port of the present invention.

FIG. 4 is a perspective partial view of the access port 23 showing collector plate 13 being withdrawn therethrough when the cover plate 22 has been removed. In this manner plates may be removed for analysis of the collected contaminants and a clean, fresh plate inserted.

Shown partially in FIG. 2 is electrical receptacle 27 for receiving the corresponding plug from a portable battery pack which preferably supplies about 12 volts. Such packs can be readily purchased or may be produced by anyone skilled in the art. The receptacle is located on the bottom panel 29 and from it electrical connections are made to the fan 7, the actuators 10 and 14, and the high voltage power supplies 5 and 11. The battery pack generates power for the extractor for extended periods of time allowing for multiple samples to be taken. Because of the low power requirements the easily portable extractor can be located at many points for sampling.

In operation, with a battery connected and a collector plate installed, when the actuators are switched on the inlet and outlet shutters are opened and the fan begins operation. In this example, the air flow through the extractor is preferably about 200 liters per minute. For high concentrations of particles, such as, immediately after a fire, explosion, or earthquake, the time required for obtaining a sufficient collection of particles for analysis is greatly reduced. Under more normal conditions, where the particle concentration is much lower, the time required to obtain a sufficient sample for analysis will be longer. Besides particle concentration, there are other factors that will affect the efficiency of particle collection, such as: distance between the ionization and collection sections and internal flow pattern, air flow rate, external wind flow and direction, particle size, surface roughness of ionization and collection substrate plates (too much roughness induces localized turbulence), and voltage of collection substrate plate, and atmospheric conditions. A person skilled in the art will recognize the effect of each factor on the collection efficiency and can compensate accordingly.

The extractor of the present invention has many uses and it can be used not only to map the fall-out of particles from power stations or industrial plants but can also be used in hospital, post offices, and prison environments, military field operations, bio-manufacturing applications and, in general, homeland defense operations. A particularly useful application is the mapping of pollutant distribution after a disaster such as a fire, explosion, or earthquake. Safe and unsafe areas can be quickly established and monitored. This mapping function can be accomplished by using an indexing system, which permits index analysis of particle distribution by location, time or both.

Indexing systems for the invention comprise several embodiments including a mechanism attached to or made part of the extraction device, and has a number of unexposed collection plates, unexposed collection plate storage receptacle, a timing mechanism, an actuator/transport mechanism, and an exposed collection plate storage/receptacle/receiver. Also, the system may have a data logging system for recording information, e.g., dwell time, collection plate identification, or date/time of collection. For example: The collection plates could be bar coded and a reader connected to the data logging device that records the collection date/time with the plate identification. Additionally, the timing mechanism may be for either operating the length of time the ports are opened/closed (dwell time) and/or when (date/time) the ports are opened (sampling frequency).

For location mapping, the sampling extractor would be placed at the first location and operated for the desired period of time; the inlet and outlet shutters closed; the plate transport would move the exposed collection plate to the receiving receptacle and move an unexposed collection plate into the extractor; the extractor would be moved to the next location wherein the extraction, operation, collection plate replacement, extractor relocation and operation would be repeated for as many locations as desired. The extractor and indexing system can be mounted on a transportation vehicle and completely automated or operated by remote control for obtaining samples in places not accessible to or under conditions hazardous to humans.

For temporal mapping, the extractor would be placed at a location and operated for the desired period of time; the inlet and outlet shutters closed; the plate transport would move the exposed collection plate to the receiving receptacle and move an unexposed collection plate into the extractor; repeat the extraction operation; then repeat the collection plate replacement and extractor operation for as many times as desired.

All of the various types of indexing systems would have to be in enclosures to avoid/prevent contamination of either the unexposed or exposed collection plates. The particles electrostatically collected are not easily dislodged from the plates as it is believed that Van der Wals forces provide inter-molecular attraction that accounts for the adherence of the particles to the collection surfaces. Thus, if support frames or racks are used to hold collection plates, it is necessary to provide sufficient distance between the collection plates to avoid or prevent contamination between the plates but it is not necessary for there to be a protective layer of inert material therebetween.

Figure 5:
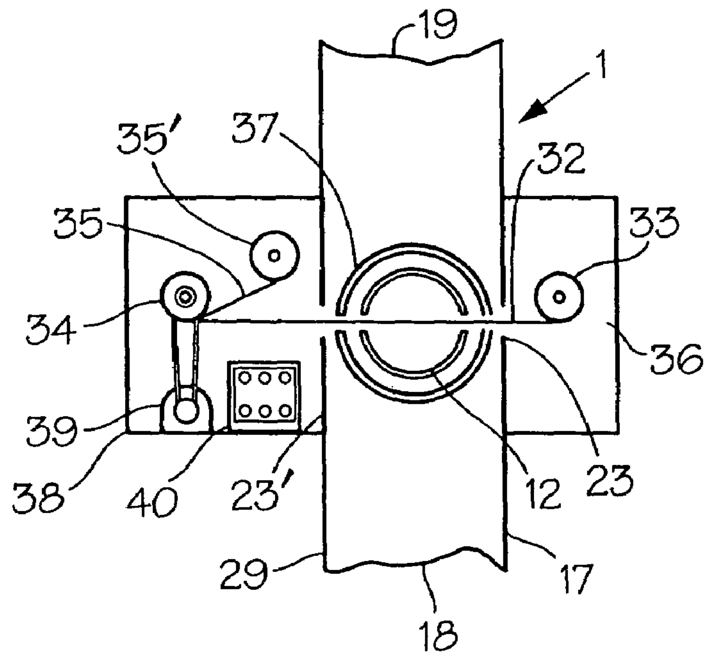
FIG. 5 shows a preferred indexing system for use with and as part of the extractor of the present invention.

A preferred embodiment indexing system is shown in FIG. 5 where the collection substrate 32 comprises sections of an electrically conductive material or foil affixed to a film or tape fed from feeder roll 33. As the drive means moves an unexposed section of the film into the chamber 37, the film is marked for identification purposes and forms "frames". The drive means 39 in FIG. 5 can be any DC driven motor with programmed switching to drive a predetermined length of film into and out of the collection chamber which is controlled by control panel 40. After exposing the frame or foil section, the exposed section is moved onto take-up roll 34 with an isolation film barrier 35 introduced there between so as to avoid/prevent contamination of the exposed section.

Figure 6:
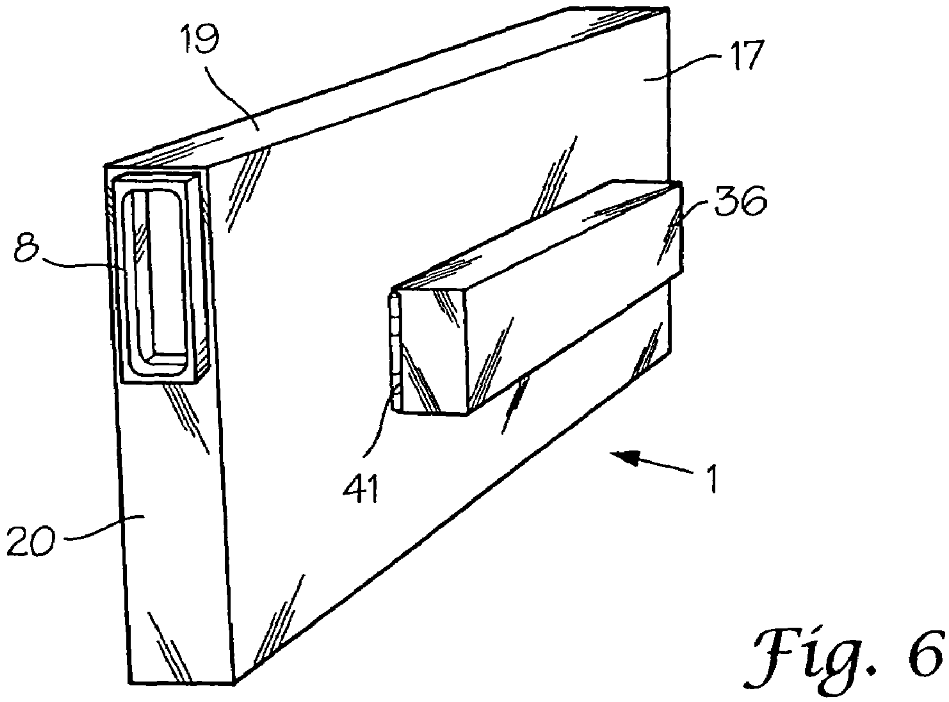
FIG. 6 is a perspective view of the extractor of the present invention with the preferred indexing system of FIG. 5 in place and covered for field use.

As shown in FIGS. 5 and 6 the indexing system is enclosed in housing members 36 and 38 and the extractor 1 is positioned on its side so that side panel 18 is now on the bottom and panel 19 on top with panels 17 and 29 being side panels. The indexing system is positioned on the panel surfaces 17 and 29 of extractor 1 so that the film or foil 32 may be initially threaded through the open access or entry port 23 in place of substrate plate 13 that is shown in FIG. 4. By viewing FIG. 1 it can be understood that the foil 32 is readily substituted for collector plate 13. In FIGS. 5 and 6 the bottom panel 29 is now on the left side. A port is provided with exit port 23' that is aligned with the entry or access port 23 so that the foil 32 can be threaded directly through the collector chamber 37 between the collector ground plates 12.

The collector substrate 32 may be a thin electrically conductive metal such as stainless steel. In this instance the foil feed roll 33 and take-up roll 34 are suspended on insulated axles as the foil will be maintained at about 8000 volts when activated to collect particles. The foil is marked or sectioned into identifiers frames and the indexing drive motor 39 is driven by the programmed controller 40 to advance the foil the distance of one frame width after exposure for a pre-determined time in the collector. Each frame is identified by the date and time of day and length of exposure. The rolls of foil may be inserted and removed in a similar manner as film from a camera as covers 36 and 38 are provided with a hinged support 41 so it may swing open for foil removal and be securely closed by a latch (not shown). Cover 38 is similarly opened and closed and a hinge for cover 38 is not shown.

Another preferred embodiment of the foil is rather than provide a continuous metal foil, discrete metal foil sections are mounted on a plastic film carrier so that the dimensions of the foil matches the dimensions of the ground plates 12 in chamber 37. Each foil is charged by a roller contact as it is positioned in the chamber 37 so that only the section in the chamber is charged and not the remainder of the roll. The discrete sections may be adhesively secured to a substrate carrier of a dimensionally stable, insulting plastic which can be a suitable polyester; or, an electrically chargeable frame may be provided by coating or depositing metal particles to provide metallized frames. After use, such film could be cleaned for re-use or disposed of.

As the film or foil exits the exit port 23', it is covered by the isolation barrier film 35 from the supply roll 35'. The isolation barrier may be of paper or plastic having a contact surface inert and non-reactive, that is, the surface of the isolation barrier will not tend to adhere to or react with any particles deposited on the foil 32.

The foil or film in the foregoing indexing system of the extractor of the present invention is easily removed and transported for analysis. It can be programmed for rapid analysis after a major disaster and perform continuous monitoring to determine the presence of unsafe levels of contamination.

It is readily apparent that this invention is not limited to the embodiment which has been especially described hereinabove with reference to the drawings. On the contrary, the invention extends to alternate forms. In particular, the extractor as described herein can be modified, made larger, or smaller, lighter, or heavier with different parts substituted therefor. It is to be specifically understood that the scope of our invention is limited only by the claims which follow:

We claim:

1. A portable, compact, aerosol contaminant extractor comprising:

a) a housing with inlet and outlet ports for admitting air to be sampled and discharging same after sampling;

b) an ionizer for charging aerosols in the air which passes therethrough from said inlet port;

c) a removable collector substrate having a plate-like surface for collecting charged aerosols and ground plates, said collector substrate being positioned between and spaced apart from the ground plates, said plates being parallel to each other and being positioned so that air which has passed through the ionizer will pass between said plates, said collector substrate being maintained at a potential sufficiently higher than ground to effect the collection of charged aerosols;

d) power supply means for maintaining high voltage for said ionizer and for said collector substrate;

e) means for moving the air through said inlet, ionizer, ground plates and collector substrate at a measured rate and discharging same through said outlet port;

f) an access port in said housing positioned so that when opened, said collector substrate may be removed so that aerosols collected on the surface of said substrate may be analyzed; and g) storage means within said housing to store additional collector substrates.

2. The aerosol contaminant extractor of claim 1 including an external electrical power receptacle on a surface of said housing, said receptacle being electrically connected to said fan and to said high voltage supply means, and an external battery with means for connecting to said receptacle.

3. The aerosol contaminant extractor of claim 1 wherein said housing is of a generally rectangular parallelepiped shape and having a weight of less than about 15 pounds.

4. The aerosol contaminant extractor of claim 1 wherein the collector substrate comprises a metal foil which may be moved into and out of said extractor.

5. The aerosol contaminant extractor of claim 1 wherein the collector substrate comprises a tape having at least one thin conductive metal sheet adhered thereto.

6. The aerosol extractor of claim 1 wherein the collector substrate comprises a plastic sheet upon which conductive metal particles have been deposited.

7. The aerosol extractor of claim 1 including means for moving said substrate into and out of said housing.

8. A portable, compact aerosol contaminant extractor comprising:

a) a longitudinal tubular ionizer section having inlet and outlet ends to permit the flow of air therethrough, the wall of said tube comprising an electrically conductive material, said conductive wall serving as an anode;

b) a cathode wire longitudinally positioned in the center of said ionizer section, the dimensions of said wire and tube being selected so that when the potential difference between said tube wall and said cathode is of about at least 8,000 volts a coronal glow discharge will be established;

c) a generally rectangular, electrically conductive, removable collector substrate having a plate-like surface for collecting aerosol contaminants;

d) a collection chamber having an inlet adapted to receive air discharged from the outlet of said ionization section, said chamber having two opposed ground plates having insulated plate support means associated therewith for holding and removably securing said collector substrate there between, said substrate and ground plates being mounted parallel to the direction of the flow of air through said chamber, said substrate being maintained at a potential of at least about 8,000 volts above the ground plates to collect airborne particulates that have been ionized by said coronal glow discharge;

e) means for moving air to be sampled through said ionizer section, and collecting chamber;

f) high voltage power supply means for providing said potential levels to said cathode and substrate; and g) a rigid, airtight container with closable inlet and outlet ports, said container housing the foregoing elements a) through g), said container having a removable lid to provide access to said collector substrate.

9. The aerosol extractor of claim 8 wherein the tubular ionizer has a length in the range from about 2.0 inches to about 2½ inches and has a diameter in the range from about 1½ inches to about 2.0 inches.

10. The aerosol extractor of claim 8 including an external electrical receptacle on said container surface, said receptacle being connected to said high voltage supply means and to said means for moving air and further including a battery external to said container with means for connecting to said receptacle.

11. The aerosol extractor of claim 8 including shutter means for closing said inlet and outlet with solenoid means for actuating said shutter means.

12. The aerosol extracts of claim 8 including storage means for additional collector plates.

13. A portable, compact aerosol contaminant extractor comprising:

a) a generally rectangular parallelepiped container having top, bottom, side, and end panels, the top panel being removable to permit access to the interior of the container, said container being air tight and manually portable by one person; the following elements being associated with or disposed within said container;

b) an inlet port formed in one end panel and an outlet port formed in the other end panel of the container whereby air to be sampled can flow into and out of said container;

c) an ionizer section in communication with said inlet port, said ionizer section comprising an ionizer ground tube having inlet and outlet ends, and an ionizer wire positioned in the longitudinal axis of said tube;

d) an ionizer high voltage power supply for supplying voltage to said ionizer wire at a potential sufficient to cause a coronal glow discharge in air passing through said tube;

e) a collector chamber for receiving air discharged from said ionizer tube, said chamber comprising ground plates with a removable collection substrate plate positioned therebetween, said plates being positioned so that their planar surfaces are parallel to the direction of air flow;

f) a high voltage power supply for establishing and maintaining a potential difference between said substrate plate and said ground plates;

g) a fan for drawing air through the inlet port into the ionizer and through the collector chamber and discharging the air through said outlet port; and, h) an access port in the top panel of said container, said port being located above the removable collector plate when said port is opened so that the collector plate can be withdrawn therethrough.

14. The aerosol contaminant extractor of claim 13 including closure shutters for said inlet and outlet ports, and solenoid means for actuating the shutters to open and close said ports.

15. The aerosol contaminant extractor of claim 13 including storage means for additional collector plates.

16. A method of extracting aerosol contaminants at diverse locations comprising the steps of:

a) providing an open ended, tubular ionizer for charging aerosol contaminants that pass therethrough;

b) providing a portable container with an air sample inlet and outlet and an access port; said container enclosing said ionizer;

c) passing air to be sampled through said inlet and into said ionizer;

d) after leaving the ionizer, passing the air sample over substrate having a charged plate-like surface positioned between the ground plates to collect charged particles on the charged collector plate; said ground and collector plates being secured within said container so that the collector plate is aligned to receive the air discharged from said ionizer;

e) removing the collector plate from between the grounded plates; and f) analyzing the particles collected on said plate.

17. The method of claim 16 including the steps of moving said substrate into said extractor and after a predetermined period of time removing said substrate from said extractor.

* * * * *